US012509568B2

(12) United States Patent
Walker et al.

(10) Patent No.: US 12,509,568 B2
(45) Date of Patent: Dec. 30, 2025

(54) RECYCLING PROCESS

(71) Applicant: WORN AGAIN TECHNOLOGIES LIMITED, Nottingham (GB)

(72) Inventors: Adam Walker, Nottingham (GB); Joshua E.S. Reid, Nottingham (GB); Lauri Kari Johannes Hauru, Nottingham (GB)

(73) Assignee: WORN AGAIN TECHNOLOGIES LIMITED, Nottingham (GB)

( * ) Notice: Subject to any disclaimer, the term of this patent is extended or adjusted under 35 U.S.C. 154(b) by 984 days.

(21) Appl. No.: 17/605,703

(22) PCT Filed: May 1, 2020

(86) PCT No.: PCT/EP2020/062221
§ 371 (c)(1),
(2) Date: Oct. 22, 2021

(87) PCT Pub. No.: WO2020/221932
PCT Pub. Date: Nov. 5, 2020

(65) Prior Publication Data
US 2022/0177667 A1    Jun. 9, 2022

(30) Foreign Application Priority Data

May 2, 2019   (GB) ..................... 1906154

(51) Int. Cl.
*C08J 11/08*    (2006.01)
*B01D 11/02*    (2006.01)
*C08J 3/09*     (2006.01)

(52) U.S. Cl.
CPC ........... *C08J 11/08* (2013.01); *B01D 11/0288* (2013.01); *C08J 3/096* (2013.01); *C08J 2301/02* (2013.01); *C08J 2467/02* (2013.01)

(58) Field of Classification Search
CPC ........ C08J 11/08; C08J 3/096; C08J 2301/02; C08J 2467/02; B01D 11/0288
See application file for complete search history.

(56) References Cited

U.S. PATENT DOCUMENTS 10,011,851 B2    7/2018  Streffer
2003/0157351 A1  8/2003  Swatloski et al.
(Continued)

FOREIGN PATENT DOCUMENTS

CN    106146877 A    11/2016
GB      2560726 A     9/2018
(Continued)

OTHER PUBLICATIONS

Peterson, A. Towards Recycling of Textile Fibers Separation and Characterization of Textile Fibers and Blends. Master's thesis in Materials Chemistry and Nanotechnology, Chalmers University of Technology. 2015. (Year: 2015).*
Wahlstrom, R. et al. Cellulose hydrolysis with thermo- and alkali-tolerant cellulases in cellulose-dissolving superbase ionic liquids. RSC Adv., 2013, 3, 20001 (Year: 2013).*
Hajipour, A.R. et al. Basic Ionic Liquids. A Short Review. J. Iran. Chem. Soc., vol. 6, No. 4, Dec. 2009, pp. 647-678. (Year: 2009).*
(Continued)

*Primary Examiner* — Christina H.W. Rosebach
(74) *Attorney, Agent, or Firm* — NIXON PEABODY LLP; David S. Resnick; Nicole D. Kling

(57) ABSTRACT

The present invention provides a process for separating cellulose from a feedstock, comprising the steps of: a) wetting the cellulose with a first solvent system to form wet cellulose; b) contacting the wet cellulose with a second solvent system to form a mixture; c) maintaining the mixture at a first temperature for a first period of time; d) maintaining the mixture at a second temperature for a second period of time to dissolve the cellulose; and e) removing the first and second solvent system containing the dissolved cellulose.

26 Claims, 1 Drawing Sheet

(56) References Cited

U.S. PATENT DOCUMENTS

| | | | |
|---|---|---|---|
| 2010/0099862 A1* | 4/2010 | Sprehe | C08B 11/20 |
| | | | 536/56 |
| 2014/0073016 A1 | 3/2014 | Brandt et al. | |
| 2014/0343270 A1* | 11/2014 | Lindstrom | D01F 2/00 |
| | | | 536/57 |
| 2016/0369456 A1* | 12/2016 | Flynn | D21C 3/20 |
| 2018/0215893 A1* | 8/2018 | Flynn | C08J 11/04 |
| 2021/0079593 A1* | 3/2021 | Abidi | C08B 16/00 |

FOREIGN PATENT DOCUMENTS

| | | | | |
|---|---|---|---|---|
| WO | 2017019802 A1 | 2/2017 | | |
| WO | 2017085516 A1 | 5/2017 | | |
| WO | 2018115584 A1 | 6/2018 | | |
| WO | WO-2018203835 A1 * | 11/2018 | | C08B 1/003 |
| WO | WO-2019143802 A1 * | 7/2019 | | C07D 233/58 |

OTHER PUBLICATIONS

Park, S.H. et al. Poly (ethylene terephthalate) recycling for high value added textiles. Fashion and Textiles 2014, 1:1. (Year: 2014).*

Parvainen, . et al. Predicting Cellulose Solvating Capabilities of Acid-Base Conjugate Ionic Liquids. ChemSusChem 2013, 6, 2161-2169. (Year: 2013).*

Kuzima, O. et al. Superbase ionic liquids for effective cellulose processing from dissolution to carbonisation. Green Chem., 2017, 19, 5949-5957 (Year: 2017).*

Muravyov, "Solutions of mixtures of cellulose and chitin in ionic liquids and composite materials based on them," Summary of thesis for PhD degree, St. Petersburg (2017) [English Translation of Relevant Extracts Provided].

De Oliveira et al. "Thermally Triggered Phase Separation of Organic Electrolyte-Cellulose Solutions." ChemSusChem 9.23: 3324-3329 (2016).

* cited by examiner

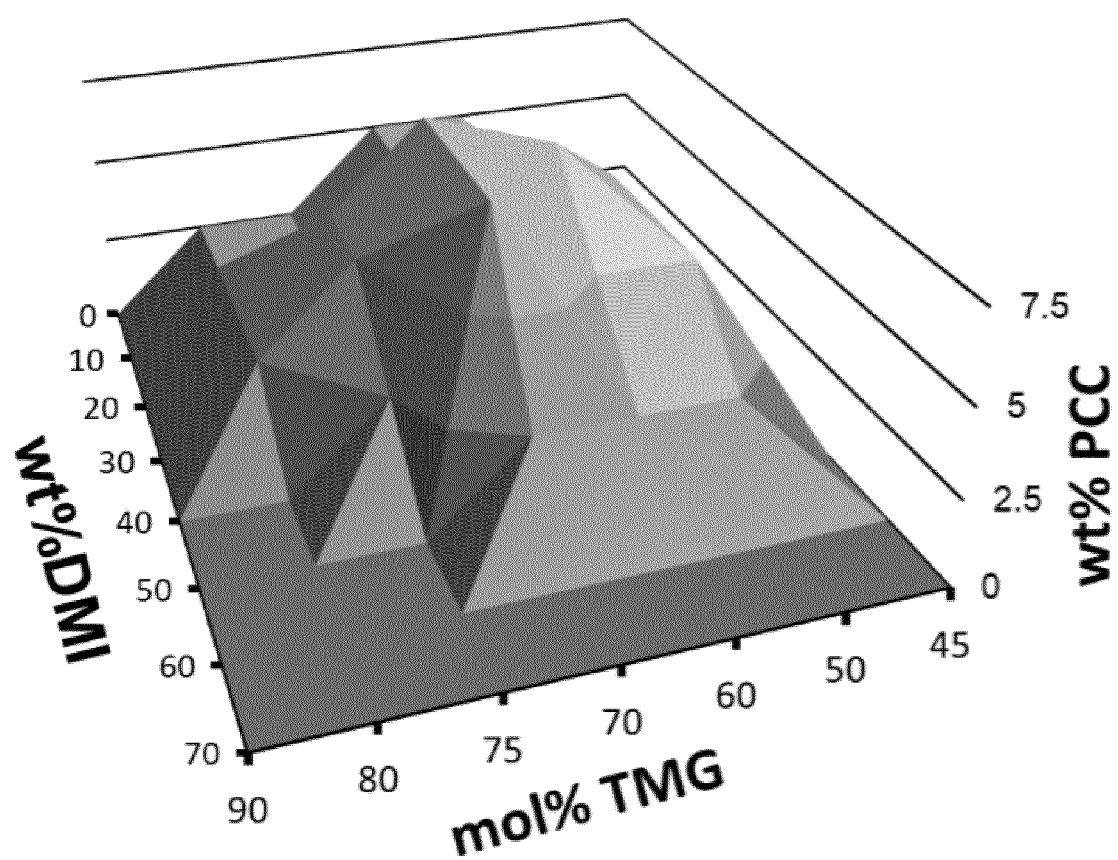

RECYCLING PROCESS

CROSS-REFERENCE TO RELATED APPLICATIONS

This application is a 35 U.S.C. § 371 National Phase Entry Application of International Application No. PCT/EP2020/062221 filed May 1, 2020, which designates the U.S. and claims benefit under 35 U.S.C. § 119 (a) of GB Application No. 1906154.8 filed May 2, 2019, the contents of which are incorporated herein by reference in their entireties.

The present invention concerns a process for separating cellulose from a feedstock. In particular, though not exclusively, the feedstock comprises fabrics and/or textiles.

Plastics are versatile materials which have found use in a variety of industries. However, the high and ever-increasing demand for plastics, together with typically poor biodegradability, has led to large amounts of plastic waste. This waste is usually difficult to dispose of and often ends up in landfill. Whilst recycling processes have been developed to convert said plastic waste into new production materials, there are still several problems associated with plastics recycling.

Plastics are particularly prevalent in the textile industry and are extensively used in garments, which tend to be regularly replaced. This consequently creates considerable waste, and it would be preferable for said waste to be recycled. Textiles typically comprise polyester and cotton (i.e. cellulose) in an amount in excess of 80%, and both have significant environmental impact. Cotton production, in particular, requires a lot of water and the use of artificial fertilisers and pesticides. Due to the desirable properties of cotton, the global demand is ever-increasing.

Cellulose is insoluble in water or conventional organic solvents, due to the intermolecular hydrogen bonding present in cellulose. Therefore, cellulosic fibres are typically generated through the Viscose process, in which highly toxic carbon disulfide is used to form cellulose xanthate, which is soluble in aqueous sodium hydroxide. An alternative method to produce fibres is the Lyocell process, in which N-methylmorpholine N-oxide (NMMO) is used to directly dissolve up to 14 wt % of cellulose. Stabilising additives have to be used to prevent side reactions. Both processes have significant economic and environmental problems, and thus there is a need for a process to dissolve cellulose which is more efficient and environmentally benign.

Recently, ionic liquids (ILs) have been used to dissolve cellulose. ILs are typically defined as molten salts with melting points below 100° C., and are of particular interest due to their thermal and chemical stability, non-flammable nature, and their ability to mix with other solvent systems.

WO03029329 is an early example of the dissolution and regeneration of cellulose from molten ionic liquids.

Hermanutz et al. (*Macromol. Symp.* 2008, 262, 23-27) describes the use of 1-ethyl-3-methyl-imidazolium acetate (EMIM acetate) for dissolving cellulose.

WO2007076979 describes a solution system for cellulose, comprising protic solvents such as water, methanol and ethanol.

WO2007057235 describes a solution containing cellulose and an ionic liquid containing anions and cations as a solvent.

WO2008043837 describes the use of 1,8-diazabicyclo[5.4.0]undec-7-ene (DBU) derived ionic liquids for dissolving cellulose.

WO2014162062 describes the use of a diazabicyclononene (DBN) based ionic liquid for dissolving lignocellulosic material.

CN106146877 describes a method for recovering waste textile using an ionic liquid. The method involves the pre-treatment of the waste textile by crushing, followed by mixing of the pre-treated waste textile, the ionic liquid and water under vacuum conditions to obtain a liquid containing cellulose.

US2016369456 and WO2017019802 describe a method for treating a cellulose-containing feedstock to isolate cellulose molecules. The method involves subjecting the cellulose-containing feedstock to at least one pre-treatment stage to produce cellulose-containing treated solids; and treating the cellulose-containing treated solids with a pulping agent to produce isolated cellulose molecules.

WO2018138416 describes the making of a cellulose fibre or film, by dissolving pulp in an ionic liquid comprising a cationic 1,5,7-triazabicyclo[4.4.0]dec-5-enium [TBDH]$^+$ moiety.

WO2018115584 describes a method of separating cellulose and polyester from a material, comprising the steps of mixing the material with a first portion of a superbase-based ionic liquid to dissolve a first portion of cellulose and form a first cellulose solution and a first residue comprising polyester, removing the first residue comprising polyester from the first cellulose solution, and directing the first cellulose solution to one or more further processing steps.

U.S. Pat. No. 1,771,460 describes dissolving cellulose in guanidine at temperatures below 0° C.

GB2560726 describes a method of extracting polymers from a substrate comprising at least two polymers. The method comprises the steps of: i) combining the substrate with a first solvent system, the first solvent system comprising an additive at a first concentration, in order to dissolve a first polymer and form a first mixture; ii) separating the first solvent system and the first polymer from the first mixture to yield a first substrate residue; iii) separating the first polymer from the first solvent system; iv) modifying the concentration of the additive in the first solvent system to a second concentration in order to form a second solvent system; v) combining the second solvent system with the first substrate residue in order to dissolve a second polymer and form a second mixture; and vi) separating the second polymer from the second solvent system.

However, the cited prior art mostly does not discuss integrating an ionic liquid into a process for dissolving and recycling cellulose. There remains a need for a simple and improved process for recycling cellulose from feedstocks that is energy efficient, cost-effective, and avoids the use of harsh and hazardous chemical reagents.

According to a first aspect of the present invention, there is provided a process for separating cellulose from a feedstock, comprising the steps of:
 a) wetting the cellulose with a first solvent system to form wet cellulose;
 b) contacting the wet cellulose with a second solvent system to form a mixture;
 c) maintaining the mixture at a first temperature for a first period of time;
 d) maintaining the mixture at a second temperature for a second period of time to dissolve the cellulose; and
 e) removing the first and second solvent system containing the dissolved cellulose.

The inventors of the present invention have surprisingly found that the sequential steps of the above-mentioned process, and the precise order in which said steps take place, yields an effective process for dissolving and recycling cellulose, which is superior to those described in the prior art. This is because the process of the present invention is cost-effective, uses non-hazardous solvents and has mild process conditions.

It has surprisingly been found that the combination of a first and second solvent system is important for effective dissolution of the cellulose. It has also surprisingly been found that it is important for the mixture to be maintained at a first temperature for a first period of time and subsequently maintained at a second temperature for a second period of time. This permits cellulose dissolution in a much shorter period of time than previously possible.

The process may further comprise the steps of separating polyester from the feedstock. Our patent applications WO2014045062 and WO2016012755 disclose methods for dissolving and extracting polyester from a feedstock, the contents of which are incorporated herein by reference. A by-product of the processes disclosed in the aforementioned applications is wet cellulose, which may correspond to step a) of the process of the present invention.

Preferably, the steps for separating polyester from the feedstock precede the steps for separating cellulose from the feedstock.

The inventors of the present invention have surprisingly found that it is important to separate the polyester from the feedstock prior to contacting the wet cellulose with the second solvent system, because it has been found that the second solvent system undesirably destroys the polyester.

The feedstock comprises cellulose. The cellulose may be provided in the form of cotton i.e. the feedstock may comprise cotton. The feedstock may also comprise polyester and other impurities, which may comprise other polymers, dye stuffs and/or water. The feedstock may therefore comprise cellulose and other impurities.

The feedstock may comprise any article which comprises cellulose, preferably an article to be recycled. The feedstock may comprise textiles and/or fabrics.

The process may further comprise step f), wherein the cellulose is recovered from the first and second solvent system. At the end of the process, the cellulose may be "regenerated" and/or recovered by introduction of an anti-solvent to precipitate the cellulose. This cellulose may undergo further post processing, such as washing, to give a pure cellulose product.

The anti-solvent may comprise an acid. The acid may comprise acetic acid, propionic acid, butyric acid, valeric acid, caproic acid, enanthic acid, caprylic acid, pelargonic acid, benzoic acid, and/or combinations of two or more thereof. The acid may comprise acetic acid and/or propionic acid.

The mixture of the invention is defined as comprising wet cellulose (wetted by the first solvent system) and the second solvent system.

The amount of cellulose that may be present in the mixture is dependent on the degree of polymerisation of said cellulose. The cellulose may be present in the mixture in an amount of from about 0.1% to about 20%, preferably about 1% to about 18%, more preferably about 5% to about 17%, most preferably about 12% to about 15% by weight of the mixture.

The first solvent system may comprise an amide. The amide may comprise a linear amide, a cyclic amide, or both linear and cyclic amides. Preferably, the first solvent system comprises a cyclic amide. The cyclic amide may comprise a cyclic urea.

The cyclic amide may comprise compounds according to the general Formula I:

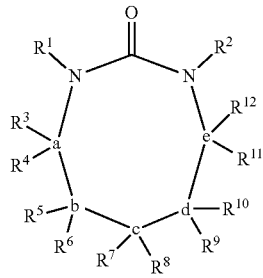

Formula I wherein $R^1$ and $R^2$ are each independently selected from: hydrogen, alkyl, alkenyl, alkynyl, aryl or alkoxy groups; $R^3$ to $R^{12}$ are each independently selected from: hydrogen, alkyl, alkenyl, alkynyl, aryl or alkoxy groups; wherein each of a to e is a carbon atom, wherein the total linear chain length of a-b-c-d-e is in the range 2 to 5 carbons.

The total linear chain length of a-b-c-d-e is often in the range 2 to 4 carbons. Preferably, the total linear chain length of a-b-c-d-e is in the range 2 to 3 carbons, and more preferably the total linear chain length of a-b-c-d-e is 2 carbons. By way of a non-limiting example, in a five membered ring, a and b could arbitrarily be present, and c, d and e arbitrarily absent. Each of a to e are equivalent in terms of possible substituents, and the identifiers a to e and $R^3$ to $R^{12}$ allow for the independent substitution of each ring carbon with each of the options for substituent as defined above. Accordingly, the total ring size may be five membered (2 carbons, for instance a and b present and c, d and e absent), six membered (3 carbons, for instance a-c present and d and e absent), seven membered (4 carbons, for instance a-d present and e absent) or eight membered (all of a-e present). However, preferably the ring will be five or six membered, more preferably five membered.

$R^3$ to $R^{12}$ may be alkyl, preferably short chain alkyl such as methyl, ethyl or n-propyl. Preferably, each carbon will carry only one substituent, so that on each carbon one of the R groups will be H. By way of a non-limiting example, $R^3$ may be hydrogen and $R^4$ selected from alkyl, alkenyl, alkynyl, aryl and alkoxy groups. Similar patterns may be found for b with $R^5$ and $R^6$, c with $R^7$ and $R^8$, d with $R^9$ and $R^{10}$, and e with $R^{11}$ and $R^{12}$.

Preferably, one or more of a-e will have the associated R groups as H, so that not all ring carbon atoms are substituted. By way of a non-limiting example, $R^3$ and/or $R^4$ may be selected from alkyl, alkenyl, alkynyl, aryl and alkoxy but the others of $R^5$-$R^{12}$ may be H. Having only one substituent (R≠H) on some or all carbon atoms and/or having substituents on some carbon atoms only, ensures that solubility is retained.

The cyclic amide may comprise N-methyl-2-pyrrolidinone, N-ethyl-2-pyrrolidinone, N-acetyl-2-pyrrolidinone, δ-valerolactam; ε-caprolactam, N-methyl-ε-caprolactam, N-acetyl-ε-caprolactam, N-phenyl-2-pyrrolidinone, N-benzyl-2-pyrrolidinone, 1,3-dimethyltetrahydro-2-pyrimidone, 1,3-diethyltetrahydro-2-pyrimidone, 1,3-dimethyl-2-imidazolidinone, 1,3-diethyl-2-imidazolidinone, and/or combinations of two or more thereof.

Preferably, the first solvent system comprises 1,3-dimethyl-2-imidazolidinone (DMI).

The first solvent system may be present in the mixture in an amount of from about 1% to about 50%, preferably about 2% to about 45%, more preferably about 3% to about 40%, even more preferably about 5% to about 35%, most preferably about 10% to about 30% by weight of the mixture. This range has been found to be most optimal for cellulose dissolution. It is preferable that the first solvent system in the mixture does not exceed an amount of about 50%, preferably about 40%, by weight of the mixture. Cellulose is unable to dissolve if higher amounts of the first solvent system are used.

The amount of first solvent system present in the mixture will depend on the morphology of the feedstock. By way of non-limiting examples, the feedstock may comprise shredded fibres of fabric. The feedstock may comprise swatches of fabric. The former example will comprise the first solvent system in a greater amount than the latter example.

The second solvent system may comprise an ionic liquid. Preferably, the ionic liquid comprises an acid and a base.

Preferably, the ionic liquid is protic. Protic ionic liquids can usually be prepared for much lower costs than aprotic ionic liquids due to their relatively straightforward synthesis.

The base may have an aqueous $pK_a$ of at least 12.

The base may comprise one or more nitrogen-containing functional groups.

The one or more nitrogen-containing functional groups may be selected from amine groups, imine groups, and/or amidine groups i.e. those having the general formula $RC(=NR)NR_2$.

Preferably, the base comprises a plurality of amine groups. The base may comprise a β-hydrogen to at least one of the plurality of amine groups.

The base may comprise guanidine and/or a guanidine derivative. Guanidines are strong bases with two amine functional groups and one imine functional group.

The guanidine and/or guanidine derivative may be substituted.

The guanidine and/or guanidine derivative may be substituted with one or more alkyl and/or aryl substituents.

The base may comprise tetramethylguanidine, derivatives of tetramethylguanidine, pentamethylguanidine, derivatives of pentamethylguanidine, tetraethylguanidine, derivatives of tetraethylguanidine, pentaethylguanidine, derivatives of pentaethylguanidine, and/or combinations of two or more thereof.

The base may comprise one or more substituted guanidines, wherein the one or more substituted guanidines each independently comprise 4 or 5 alkyl substituents, wherein each alkyl substituent is independently selected from methyl, ethyl, monoalkylformamidine, dialkylformamidine and trialkylformamidine, wherein the alkylformamidine is substituted by methyl, ethyl, propyl or isopropyl.

Preferably, the base comprises 1,1,3,3-tetramethylguanidine (TMG).

The base may comprise one or more amidine groups.

For example, the base may comprise 1,5-diazabicyclo[4.3.0]non-5-ene (DBN), 1,5,7-triazabicyclo[4.4.0]dec-5-ene (MTBD), and/or 1,8-diazabicyclo[5.4.0]undec-7-ene (DBU).

The acid may comprise a carboxylic acid of general formula RCOOH, wherein R is an optionally substituted hydrocarbyl group.

The optionally substituted hydrocarbyl group may comprise between one and eight carbon atoms. It is preferable for the optionally substituted hydrocarbyl group to comprise at least one carbon. Without wishing to be bound by theory, it is believed that the β-H to the carboxylate (i.e. on the carbon adjacent to the carboxylate group) is important in providing the desired dissolution properties of the ionic liquid.

The acid may comprise acetic acid, propionic acid, butyric acid, valeric acid, caproic acid, enanthic acid, caprylic acid, pelargonic acid, benzoic acid, and/or combinations of two or more thereof. Preferably, the acid comprises acetic acid (OAc) and/or propionic acid. More preferably, the acid comprises acetic acid (OAc).

By way of specific, non-limiting examples, the ionic liquid may comprise one or more of: 1,1,3,3-tetramethylguanidinium acetate; 1,1,3,3-tetramethylguanidinium propionate; 1,1,2,3,3-pentamethylguanidinium acetate; 1,1,2,3,3-pentamethylguanidinium propionate; 1,2-dimethyl-5,6-dihydro-4H-pyrimidinium acetate; 1,2-dimethyl-5,6-dihydro-4H-pyrimidinium propionate; 1,5-diazabicyclo[4.3.0]non-5-enium acetate; 1,5-diazabicyclo[4.3.0]non-5-enium propionate; 1,5,7-triazabicyclo[4.4.0]dec-5-enium acetate; and/or 1,5,7-triazabicyclo[4.4.0]dec-5-enium propionate.

The ionic liquid may comprise a stoichiometric excess of base. In other words, the base may be present in the ionic liquid in an amount greater than that of the acid. The inventors of the present invention have surprisingly found that solvents comprising an ionic liquid with an excess of base compared to acid are more effective cellulose dissolution solvents than those comprising a stochiometric mixture of acid and base. Without wishing to be bound by theory, this is likely due to the increased hydrogen bond basicity of an ionic liquid comprising a stoichiometric excess of base.

The base may be present in the ionic liquid in an amount of from about 40 mol % to about 80 mol %, preferably about 45 mol % to about 75 mol %, more preferably about 50 mol % to about 70 mol %, even more preferably about 52 mol % to about 68 mol %, most preferably about 55 mol % to about 65 mol %. It is preferable that the base in the ionic liquid does not exceed an amount of about 80 mol %. Cellulose is unable to dissolve if higher amounts of base are used.

The acid may be present in the ionic liquid in an amount of from about 20 mol % to about 60 mol %, preferably about 25 mol % to about 55 mol %, more preferably about 30 mol % to about 50 mol %, even more preferably about 32 mol % to about 48 mol %, most preferably about 35 mol % to about 45 mol %.

The inventors of the present invention have surprisingly found that a mixture of an ionic liquid, comprising 1,1,3,3-tetramethylguanidine and acetic acid i.e. 1,1,3,3-tetramethylguanidinium acetate, and 1,3-dimethyl-2-imidazolidinone is particularly effective at dissolving cellulose. The mixture has been found to selectively dissolve cellulose, and not other polymers such as polypropylene, polytetrafluoroethylene and nylon, which may be present in the feedstock.

Without wishing to be bound by theory, it is believed that a two-step process is required for effective cellulose dissolution. The mixture is maintained at a first temperature for a first period of time, to allow for swelling, breakdown and homogenisation. The mixture is then maintained at a second temperature for a second period of time, during which the cellulose is dissolved.

The first temperature may be different from the second temperature. Preferably, the first temperature is greater than the second temperature.

The first temperature may be in the range of from about 70° C. to about 120° C., preferably from about 80° C. to about 120° C., more preferably from about 90° C. to about 120° C., even more preferably from about 100° C. to about 120° C., most preferably from about 100° C. to about 110° C. It is preferable that the first temperature does not exceed 120° C.

The second temperature is dependent on the molecular weight of the cellulose. The second temperature may be in the range of from about 20° C. to about 75° C., preferably from about 20° C. to about 70° C., more preferably from about 20° C. to about 60° C., most preferably from about 20° C. to about 50° C.

The first period of time may be about the same as the second period of time. The first period of time may be different from the second period of time. The first period of time may be longer than the second period of time. The first period of time may be shorter than the second period of time.

The first period of time may be in the range of from about 0.1 hours to about 24 hours, preferably from about 0.1 hours to about 12 hours, more preferably from about 0.1 hours to about 6 hours, even more preferably from about 0.1 hours to about 4 hours, yet more preferably from about 0.1 hours to about 1 hour, further more preferably from about 0.2 hours to about 1 hour, most preferably from about 0.2 hours to about 0.5 hours.

The second period of time may be in the range of from about 0.1 hours to about 24 hours, preferably from about 0.1 hours to about 12 hours, more preferably from about 0.1 hours to about 6 hours, most preferably from about 0.1 hours to about 3 hours.

The mixture may be substantially free from water. The inventors of the present invention have found that the presence of water in the feedstock or in the first or second solvent system drastically affects the first and second temperatures, and consequently the ability of the process to dissolve cellulose. Without wishing to be bound by theory, this is because water is an anti-solvent for the precipitation of cellulose, as water disrupts the hydrogen bonding network between the ionic liquid and the cellulose. It is therefore preferable to limit the amount of water in the mixture.

By "substantially free" we preferably mean that water is present (if at all) in an amount of less than about 4 wt %, preferably less than about 3 wt %, more preferably less than about 2 wt %, most preferably less than about 1 wt % of the mixture. It has been found that cellulose is unable to dissolve in the mixture of the invention when water is present in an amount greater than about 4 wt %.

According to a second aspect of the present invention, there is provided a process for separating polyester and cellulose from a feedstock, comprising the steps of:
i. dissolving and extracting polyester; and
ii. separating cellulose according to the invention.

Our patent applications WO2014045062 and WO2016012755 disclose methods for dissolving and extracting polyester from a feedstock, the contents of which are incorporated herein by reference. A by-product of the processes disclosed in the aforementioned applications is wet cellulose, which may correspond to step a) of the process of the present invention.

The process may further comprise the steps of dissolving and removing dye stuffs from the feedstock. The process may further comprise the steps of dissolving and removing impurities from the feedstock. The process may further comprise the steps of dissolving and removing dye stuffs and impurities from the feedstock.

The polyester may comprise polyglycolic acid, polylactic acid, polycaprolactone, polyethylene adipate, polyhydroxyalkanoate, polyethylene terephthalate, polybutylene terephthalate, polytrimethylene terephthalate, polyethylene naphthalate, and/or combinations of two or more thereof. Preferably, the polyester comprises polyethylene terephthalate.

According to a third aspect of the present invention, there is provided a process for separating polyester and cellulose from a feedstock using a solvent system comprising a cyclic urea and an ionic liquid, comprising a carboxylic acid and an optionally substituted guanidine.

The optionally substituted guanidine may be present in the ionic liquid in an amount greater than that of the carboxylic acid.

The invention will now be more particularly described with reference to the following examples and figures, in which;

FIG. 1 illustrates how the wt % of dissolved cellulose varies with the wt % of DMI in the mixture, and the ratio of acid:base in the IL.

EXAMPLE 1

Roughly chopped Post-Consumer Cotton (PCC) sheets, 7.5 g, was heated in a large excess of DMI at 110° C. for 1-2 hours. The excess DMI was removed and the DMI retention of the fabric was calculated to be 2.7 times its mass. In a separate vessel, TMGA (60:40 mol ratio TMG:Acetate) was prepared and kept hot at 110° C. To account for the total DMI in the system 30 g of extra DMI was added to the wet textile, to bring the final DMI wt % in the solution to 20 wt % and the cotton concentration to 5 wt %. The hot IL solution was transferred from its vessel into the vessel containing the wet textile with DMI and stirring was started with an overhead stirrer and standard impeller. Mixing of the fabric in the solvent was good, with all the fabric being "moved" around the flasks in a circular motion by the impeller whilst a strong vortex was seen. Within 20 minutes the fabric was fully homogenised in the solvent, at the "mash" undissolved stage at the high temperature. After 1 hour of cooling to room temperature without stirring, a clear and viscous solution was formed.

COMPARATIVE EXAMPLE A

A solution of TMGA (60:40 mol ratio TMG:Acetate) and DMI was made up and stirred at 110° C. with an overhead stirrer on the lowest RPM speed. After 15 minutes of reaction and temperature equilibration, roughly chopped PCC was added to make a final solution of containing 20 wt % DMI and 5 wt % PCC. After ca. 40 minutes the mixture was observed to reach the point where the fabric was swelled and dispersed in the solvent. Upon cooling, the viscosity increased rapidly, and the bulk solution turned clearer, but there was still significant undissolved cotton in the solution. The solution was re-heated to 110° C. and stirred at a higher RPM for ca. 20 minutes. Upon cooling to room temperature, there were still pieces of undissolved cotton and the solution was not entirely clear, but very slightly opaque.

This comparative example demonstrates the importance of firstly wetting the cellulose with a first solvent system to form wet cellulose, before contacting the wet cellulose with a second solvent system. This systematic process allows for the cellulose to be fully dissolved.

EXAMPLE 2

FIG. 1 shows what effect changing the wt % of DMI in the mixture, and the ratio of acid:base in the IL, has on the wt % of dissolved cellulose in the mixture.

The cotton and solvent mixtures were heated to 80° C. overnight and subsequently cooled to room temperature. The cellulose saturation limit (the maximum wt % of dissolved cellulose in the mixture) was determined when the solutions were cloudy, turbid or had undissolved fibres still present.

As demonstrated in FIG. 1, for the conditions as described, it was found that the wt % of dissolved cellulose peaks at around 55:45 60:40 mol % [TMGH]:[OAc] and 20-30 wt % DMI. This gave a maximum of 7.5 wt % PCC being dissolved.

Surprisingly, it was found that mixtures containing 50:50 mol % [TMGH]:[OAc] dissolved slightly less PCC (with a maximum of 5 wt %) compared to those using an excess of TMG. On the other hand, an excess of OAc (i.e. 45:55 mol % [TMGH]:[OAc]) prevented cellulose dissolution from happening.

At compositions with a greater than 70:30 mol % of [TMGH]:[OAc] it was found that cellulose dissolution ability decreases. Mixtures containing 80:20 mol % [TMGH]:[OAc] dissolved only a maximum of 2.5 wt % PCC, and mixtures containing 90:10 mol % [TMGH]:[OAc] were unable to dissolve any cellulose.

FIG. 1 also shows the effect of changing the wt % of the first solvent system (in this case, DMI) in the mixture on the wt % of dissolved cellulose in the mixture.

As can be seen in the FIGURE, in the range of 0-10 wt % DMI the mixture can dissolve only a maximum of 5 wt % cellulose. The most cellulose (up to 7.5 wt %) can be dissolved in the range of 10-30 wt % DMI. This decreases at values of DMI greater than 30 wt %, and dramatically decreases at values of DMI greater than 40 wt %. It was found that no cellulose can dissolve in mixtures where DMI is present in an amount greater than 60 wt %.

EXAMPLE 3

Table 1 shows whether or not samples of cellulose dissolved at different ratios of [TMGH]:[OAc], different wt % of DMI and different first temperatures. The ratios in the table relate to the ratio of [TMGH]:[OAc]. A cross indicates that the sample dissolved.

TABLE 1

| % | First Temperature = 110° C. | | First Temperature = 80° C. | |
| --- | --- | --- | --- | --- |
| DMI | 50:50 | 60:40 | 50:50 | 60:40 |
| 0 | X | X | | X |
| 10 | X | X | | |
| 20 | X | X | | X |
| 30 | X | X | | X |
| 40 | X | X | | |

As can be seen from the table, cellulose is able to dissolve in mixtures of both 50:50 and 60:40 [TMGH]:[OAc] between 0-40 wt % DMI and with a first temperature of 110° C. However, with a first temperature of 80° C., none of the cellulose samples in the 50:50 mixtures were able to dissolve. On the other hand, the mixtures comprising 60:40 [TMGH]:[OAc] alongside 0-30 wt % DMI were able to dissolve cellulose.

This further demonstrates that those mixtures comprising an excess of TMGH performed better than those comprising a stoichiometric amount of TMGH and OAc.

EXAMPLE 4

A range of DMI compositions (0-40 wt % of the mixture) and two ratios of [TMGH]:[OAc] in the ionic liquid (50:50 and 60:40) were used to demonstrate the effect on the second temperature and second period of time. 2.5 wt % and 5 wt % of PCC were used, and the results outlined in Tables 2 and 3. In all cases the first temperature was 110° C. The word "part" indicates that the mixture was mostly clear, but with some trapped fibres/cotton pieces, or not quite clear.

TABLE 2

| | 50:50 [TMGH]:[OAC] | | | 60:40 [TMGH]:[OAC] | | |
| --- | --- | --- | --- | --- | --- | --- |
| 2.5 wt % PCC DMI/ wt % | Min. First Period of Time (min) | Average Second Period of Time (min:sec) | Average Second Temperature (° C.) | Min. First Period of Time (min) | Average Second Period of Time (min:sec) | Average Second Temperature (° C.) |
| 0 | 60 | 9:58 | 49 | 10 | 3:05 | 75 |
| 10 | 10 | 7:53 | 53 | 10 | 3:44 | 69.4 |
| 20 | 15 | 11:01 | 46 | 10 | 4:08 | 62.4 |
| 30 | 15 | 16:47 | 37 | 15 | 7:16 | 49 |
| 40 | 60 | Overnight | RT | 15 (Part) | 27:48 | RT |

TABLE 3

| | 50:50 [TMGH]:[OAc] | | | 60:40 [TMGH]:[OAc] | | |
| --- | --- | --- | --- | --- | --- | --- |
| 5.0 wt % PCC DMI/ wt % | Min. First Period of Time (min) | Average Second Period of Time (min:sec) | Average Second Temperature (° C) | Min. First Period of Time (min) | Average Second Period of Time (min:sec) | Average Second Temperature (° C.) |
| 0 | 60 (Part) | 21:06 | 32.6 (Part) | 30 | 6:33 | 62 |
| 10 | 10 | 11:56 | 45.3 | 10 | 5:19 | 65 |
| 20 | 30 | 20:46 | 37.8 | 10 | 6:37 | 60 |
| 30 | 240 | Overnight | RT | 45 | 19:14 | 33 |
| 40 | 60 (Part) | 1 + day (Part) | RT | 30 (Part) | 1 + hours (Part) | RT |

As can be seen from the tables, the second period of time is considerably quicker for 60:40 [TMGH]:[OAc] mixtures compared to 50:50 [TMGH]:[OAc] mixtures. Therefore, it is clear that cellulose is able to dissolve quicker in mixtures with a stoichiometric excess of TMGH.

Furthermore, 60:40 [TMGH]:[OAc] mixtures generally dissolve cellulose at a higher second temperature than 50:50 [TMGH]:[OAc] mixtures, and therefore requires less of a decrease in temperature from the first temperature. The lower decrease in temperature is advantageously energy saving.

The invention claimed is:

1. A process for separating cellulose from a feedstock, comprising the steps of:
   a) wetting the cellulose with a first solvent system to form wet cellulose, wherein the first solvent system comprises an amide;
   b) contacting the wet cellulose with a second solvent system to form a mixture, wherein the second solvent system comprises an ionic liquid comprising an acid and a base;
   c) maintaining the mixture at a first temperature for a first period of time;
   d) maintaining the mixture at a second temperature for a second period of time to dissolve the cellulose; and
   e) removing the first solvent system and the second solvent system containing the dissolved cellulose;
   wherein the first temperature is different from the second temperature; and wherein the mixture comprises no more than 4 wt % of water.

2. The process according to claim 1 further comprising the steps of separating polyester from the feedstock.

3. The process according to claim 2 wherein the steps for separating polyester from the feedstock precede the steps for separating cellulose from the feedstock.

4. The process according to claim 2 wherein the polyester is selected from the group consisting of: polyglycolic acid, polylactic acid, polycaprolactone, polyethylene adipate, polyhydroxyalkanoate, polyethylene terephthalate, polybutylene terephthalate, polytrimethylene terephthalate, polyethylene naphthalate, and combinations of two or more thereof.

5. The process according to claim 1 further comprising the steps of dissolving and removing dye stuffs or impurities from the feedstock.

6. The process according to claim 1 further comprising step f) recovering the cellulose from the first solvent system and the second solvent system.

7. The process according to claim 1 wherein the feedstock comprises textiles or fabrics.

8. The process according to claim 1 wherein the cellulose is present in the mixture in an amount of from 0.1% to 20% by weight of the mixture.

9. The process according to claim 1 wherein the first solvent system is present in the mixture in an amount of from 1% to 50% by weight of the mixture.

10. The process according to claim 1 wherein the base has an aqueous $pK_a$ of at least 12.

11. The process according to claim 1 wherein the base comprises one or more nitrogen-containing functional groups.

12. The process according to claim 1 wherein the base comprises guanidine or a guanidine derivative.

13. The process according to claim 1 wherein the acid comprises a carboxylic acid of general formula RCOOH, wherein R is an optionally substituted hydrocarbyl group.

14. The process according to claim 13 wherein the optionally substituted hydrocarbyl group comprises between one and eight carbon atoms.

15. The process according to claim 1 wherein the acid comprises acetic acid.

16. The process according to claim 1 wherein the ionic liquid is selected from one or more of the group consisting of: 1,1,3,3-tetramethylguanidinium acetate; 1,1,3,3-tetramethylguanidinium propionate; 1,1,2,3,3-pentamethylguanidinium acetate; 1,1,2,3,3-pentamethylguanidinium propionate; 1,2-dimethyl-5,6-dihydro-4H-pyrimidinium acetate; 1,2-dimethyl-5,6-dihydro-4H-pyrimidinium propionate; 1,5-diazabicyclo[4.3.0]non-5-enium acetate; 1,5-diazabicyclo[4.3.0]non-5-enium propionate; 1,5,7-triazabicyclo[4.4.0]dec-5-enium acetate; and 1,5,7-triazabicyclo[4.4.0]dec-5-enium propionate.

17. The process according to claim 1 wherein the base is present in the ionic liquid in an amount greater than that of the acid.

18. The process according to claim 1 wherein the base is present in the ionic liquid in an amount of from 40 mol % to 80 mol %.

19. The process according to claim 1 wherein the acid is present in the ionic liquid in an amount of from 20 mol % to 60 mol %.

20. The process according to claim 1 wherein the first temperature is greater than the second temperature.

21. The process according to claim 1 wherein the first temperature is in the range of from about 70° C. to about 120° C.

22. The process according to claim 1 wherein the second temperature is in the range of from about 20° C. to about 75° C.

23. The process according to claim 1 wherein the first solvent system comprises a cyclic amide.

24. The process according to claim 1 wherein the first solvent system comprises 1,3-dimethyl-2-imidazolidinone.

25. The process according to claim 11 wherein the one or more nitrogen-containing functional groups are selected from amine groups, imine groups, and/or amidine groups.

26. The process according to claim 1 wherein the base comprises 1,1,3,3-tetramethylguanidine.

* * * * *